(12) United States Patent
Ooguri (10) Patent No.: US 11,136,501 B2
(45) Date of Patent: Oct. 5, 2021

(54) METHOD OF PRODUCING THIOGALLATE-BASED FLUORESCENT MATERIAL AND A SULFITE FOR A THIOGALLATE-BASED FLUORESCENT MATERIAL

(71) Applicant: NICHIA CORPORATION, Tokushima (JP)

(72) Inventor: Hirofumi Ooguri, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 752 days.

(21) Appl. No.: 15/389,628

(22) Filed: Dec. 23, 2016

(65) Prior Publication Data

US 2017/0183566 A1    Jun. 29, 2017

(30) Foreign Application Priority Data

Dec. 28, 2015 (JP) .............................. JP2015-255951

(51) Int. Cl.
*C09K 11/77* (2006.01)

(52) U.S. Cl.
CPC ................................ *C09K 11/7731* (2013.01)

(58) Field of Classification Search
CPC ............ C09K 11/7731; C09K 11/7718; C09K 11/7721; C09K 11/7734; C09K 11/7787; C09K 11/02; C09K 11/08; C09K 11/00
USPC ..................................... 252/301.4 R, 301.4 S
See application file for complete search history.

(56) References Cited

U.S. PATENT DOCUMENTS

| | | | |
|---|---|---|---|
| 2,210,405 A * | 8/1940 | Haywood ............... | C01F 11/48 423/512.1 |
| 6,924,233 B1 | 8/2005 | Chua et al. | |
| 7,959,321 B2 | 6/2011 | Ryu et al. | |
| 8,017,961 B2 | 9/2011 | Kim et al. | |
| 8,088,302 B2 | 1/2012 | Kim et al. | |
| 8,132,952 B2 | 3/2012 | Ryu et al. | |
| 9,181,476 B2 | 11/2015 | Izawa et al. | |
| 10,047,931 B2 | 8/2018 | Izawa et al. | |
| 10,093,853 B2 | 10/2018 | Yagihashi | |
| 2009/0096350 A1 | 4/2009 | Kim et al. | |
| 2009/0191228 A1 | 7/2009 | Gebbink et al. | |
| 2009/0191229 A1 | 7/2009 | MacDonald et al. | |
| 2010/0177534 A1 | 7/2010 | Ryu et al. | |
| 2011/0026242 A1 | 2/2011 | Ryu et al. | |
| 2011/0227476 A1 | 9/2011 | Zhang et al. | |
| 2011/0273864 A1 * | 11/2011 | Izawa ................ | C09K 11/7741 362/84 |
| 2016/0061418 A1 | 3/2016 | Izawa et al. | |
| 2016/0222287 A1 * | 8/2016 | Yagihashi .......... | C09K 11/7731 |
| 2017/0183566 A1 | 6/2017 | Ooguri | |
| 2018/0155619 A1 | 6/2018 | Ooguri | |

FOREIGN PATENT DOCUMENTS

| | | |
|---|---|---|
| JP | 2008537629 A | 9/2008 |
| JP | 2009507935 A | 2/2009 |
| JP | 2011-236310 A | 11/2011 |
| JP | 2015-059202 A | 3/2015 |
| JP | 2017119745 A | 7/2017 |
| WO | 2010/029654 A1 | 3/2010 |
| WO | WO-2015040855 A1 * | 3/2015 |

OTHER PUBLICATIONS

Braunger, D. et al. "Improved Growth of $SrGa_2S_4$ Thin Film Electroluminescence Phosphors" Materials Research Society Symposium, vol. 424, (1997), pp. 453-458.

United States Patent and Trademark Office. Restriction Requirement dated Aug. 21, 2020 in U.S. Appl. No. 15/827,503, 9 pages.

* cited by examiner

*Primary Examiner* — Matthew E. Hoban
*Assistant Examiner* — Lynne Edmondson
(74) *Attorney, Agent, or Firm* — Hunton Andrews Kurth LLP (57) ABSTRACT

A method of producing a thiogallate-based fluorescent material having a large particle diameter and an enhanced luminance, and a sulfite for a thiogallate-based fluorescent material are provided. The method of producing a thiogallate-based fluorescent material includes preparing a first solution containing at least one element M1 selected from the group consisting of strontium, beryllium, magnesium, calcium, barium and zinc, and at least one element M2 selected from the group consisting of europium and cerium, and a second solution containing a sulfite; simultaneously supplying the first solution and the second solution to a reaction vessel and causing a reaction in a reaction system to obtain a powder of a sulfite containing M1 and M2; and obtaining the thiogallate-based fluorescent material from the resulting powder of a sulfite containing M1 and M2.

27 Claims, 6 Drawing Sheets

METHOD OF PRODUCING THIOGALLATE-BASED FLUORESCENT MATERIAL AND A SULFITE FOR A THIOGALLATE-BASED FLUORESCENT MATERIAL

CROSS-REFERENCE TO RELATED APPLICATIONS

This application claims the benefit of Japanese Patent Application No. 2015-255951, filed on Dec. 28, 2015, the disclosure of which is hereby incorporated by reference in its entirety.

BACKGROUND

Technical Field

The present disclosure relates to a method of producing a thiogallate-based fluorescent material, and a sulfite for a thiogallate-based fluorescent material.

Description of Related Art

Japanese Unexamined Patent Publication No. 2011-236310 discloses a method of producing thiogallate-based fluorescent material, in which a sulfite is added in a solution that contains an europium compound and a strontium compound, and obtains powder containing europium and strontium. Then, the obtained powder is mixed with a powder of gallium compound, and calcined to obtain particles of a thiogallate-based fluorescent material.

Japanese Unexamined Patent Publication No. 2011-236310 also discloses a method of producing thiogallate-based fluorescent material, in which powder of a gallium compound is added in a solution that contains an europium compound and a strontium compound, and then a sulfate is added in the solution, and obtains powder mixture of powder containing europium and strontium and powder of a gallium compound. Then, the obtained powder mixture is calcined to obtain particles of a thiogallate-based fluorescent material.

Japanese Unexamined Patent Publication No. 2015-059202 discloses a method of producing a thiogallate-based fluorescent material, in which a mixed solution containing a europium compound, a strontium compound, and a calcium compound is added in drops to a sulfite solution that contains powder of a gallium compound and obtains a powder mixture of sulfites containing Sr, Ca, Eu and Ga, and firing the powder mixture to produce a thiogallate-based fluorescent material represented by a formula: $(Sr_{1-w}Ca_w)_{1-w}Ga_2S_4:Eu_v$ ($0.03 \leq w \leq 0.20$, $0 < v \leq 1$).

SUMMARY

A higher luminance in thiogallate-based fluorescent materials is desirable. Since the luminance of a thiogallate-based fluorescent material depends on the particle diameter of fluorescent material, it has been desired to develop a thiogallate-based fluorescent material having a larger particle diameter. In order to achieve the above, an increase in the particle size of a sulfate, which is a raw material of the thiogallate-based fluorescent material that contains constituent elements of a desired thiogallate-based fluorescent material, is necessary.

Unfortunately, the strontium-containing sulfite produced by adding a solution containing a sulfite to a solution containing strontium as described in JP 2011-236310A, or the strontium-containing sulfite produced by adding a solution containing strontium to a solution containing a sulfite as described in JP 2015-059202A, has a small particle diameter that is insufficient to increase luminance of the resulting thiogallate-based fluorescent material.

An object of the present disclosure is to provide a method of producing a thiogallate-based fluorescent material having a large particle diameter and an enhanced luminance.

Another object of the present disclosure is to provide a sulfite having a large particle diameter, for a thiogallate-based fluorescent material having a large particle diameter.

A method of producing a thiogallate-based fluorescent material according to one embodiment of the present disclosure includes:

preparing a first solution containing at least one element M1 selected from the group consisting of strontium, beryllium, magnesium, calcium, barium and zinc, and at least one element M2 selected from the group consisting of europium and cerium, and a second solution containing a sulfite;

simultaneously supplying the first solution and the second solution to a reaction vessel and causing a reaction in a reaction system to obtain a powder of a sulfite containing M1 and M2; and obtaining the thiogallate-based fluorescent material from the resulting powder of a sulfite containing M1 and M2.

A method of producing a thiogallate-based fluorescent material according to one embodiment of the present disclosure includes:

preparing a first solution containing at least one element M1 selected from the group consisting of strontium, beryllium, magnesium, calcium, barium and zinc, a second solution containing at least one element M2 selected from the group consisting of europium and cerium, and a third solution containing a sulfite;

simultaneously supplying the first solution, the second solution, and the third solution to a reaction vessel and causing a reaction in a reaction system to obtain a powder of a sulfite containing M1 and M2; and obtaining the thiogallate-based fluorescent material from the resulting powder of a sulfite containing M1 and M2.

A sulfite for a thiogallate-based fluorescent material according to one embodiment of the present disclosure has an average particle diameter of 1.5 µm or greater, and a ratio of a 50% average particle diameter based on a volume-based cumulative particle size distribution to the average particle diameter in a range of 1 to 2.5, and comprises at least one element M1 selected from the group consisting of strontium, beryllium, magnesium, calcium, barium and zinc, and at least one element M2 selected from the group consisting of europium and cerium.

The present disclosure can provide a method of producing a thiogallate-based fluorescent material having a large particle diameter and an enhanced luminance, and a sulfite for a thiogallate-based fluorescent material having a large particle diameter.

DETAILED DESCRIPTION

A method of producing a thiogallate-based fluorescent material, and the sulfite for a thiogallate-based fluorescent material according to certain embodiments of the present disclosure will be described below. The relation between the wavelength ranges of light and the color names of single color light conforms to JIS Z8110.

A method of producing a thiogallate-based fluorescent material according to an exemplary embodiment of the present disclosure includes:

a step (A) of preparing a solution (a-1) containing at least one element M1 selected from the group consisting of strontium, beryllium, magnesium, calcium, barium and zinc, and at least one element M2 selected from the group consisting of europium and cerium, and a solution (b-1) containing a sulfite;

a step (B) of simultaneously supplying the solution (a-1) and the solution (b-1) to a reaction vessel and causing a reaction in a reaction system to obtain a powder of a sulfite containing M1 and M2; and a step (C) of mixing the resulting powder of a sulfite containing M1 and M2 and powder of a gallium compound and firing the mixed powder under a hydrogen sulfide atmosphere to obtain the thiogallate-based fluorescent material.

In the exemplary embodiment, a powder of a sulfite containing M1 and M2 is obtained in the reaction system in which the solution (a-1) and the solution (b-1) simultaneously supplied to a reaction vessel are reacted in the step (B) of obtaining the powder of a sulfite. The resulting powder of a sulfite containing M1 and M2 includes secondary particles that are agglomerates of primary particles.

When sulfite ions, M1 ions, and M2 ions are simultaneously supplied to cause a reaction in a state with nearly equivalent amounts of anions and cations, an appropriate reaction speed of the anions and the cations can be achieved so that the growth of primary particles can be promoted than creation of numeral amount of priority particles. Accordingly, a powder of a sulfite containing M1 and M2 and containing primary particles with a large primary particle size can be obtained.

Step (A): Preparing Solution

Solution (a-1)

The solution (a-1) is prepared from a compound containing at least one element M1 selected from the group consisting of strontium (Sr), beryllium (Be), magnesium (Mg), calcium (Ca), barium (Ba) and zinc (Zn), at least one element M2 selected from the group consisting of europium (Eu) and cerium (Ce), and a solvent which dissolves the compounds. Any solvent that can dissolve the compound containing M1 and the compound containing M2 without causing a reaction can be used. Among those, pure water having a low impurity content is preferable.

A compound that contains M1 and that can be dissolved in the solvent can be employed. The examples thereof include, in view of the ease in availability at least one metal chloride selected from the group consisting of chlorides of Sr, Be, Mg, Ca, Ba and Zn.

A compound that contains M2 and that can be dissolved in the solvent can be employed. The examples thereof include, in view of the ease in availability at least one metal chloride selected from the group consisting of chlorides of Eu and Ce.

The contents of M1 and M2 are appropriately adjusted in the range in which the compound containing M2 is substantially dissolved in the solvent. For example, when the compound containing M1 is $SrCl_2$, the compound containing M2 is $EuCl_3$, and the solvent is pure water, the M1 content in the solution (a-1) is adjusted in a range of 10.0 to 20.0% by mass, and the M2 content is adjusted in a range of 0.5 to 8.0% by mass.

Solution (b-1)

The solution (b-1) is a solution containing a sulfite. The sulfite that can supply sulfite ions can be used, but of those, ammonium sulfite that does not contain any metal is preferable. The sulfite is adjusted so that the content of sulfite ions in the solution (b-1) is in a range of 10.0 to 30.0% by mass.

The pH of the solution (b-1) is preferably adjusted in a range of 7.0 to 8.0. When the pH of the solution (b-1) is in the range of 7.0 to 8.0, the pH in the reaction system of the subsequent step of obtaining a powder does not change significantly, so that the reaction among M1 ions, M2 ions, and sulfite ions can proceed at an appropriate and stable reaction rate.

Step (B): Obtaining Powder

In the step (B) of obtaining a powder, the solution (a-1) and the solution (b-1) are simultaneously supplied to a reaction vessel to cause a reaction in the reaction system and a powder of a sulfite containing M1 and M2 is obtained. The solution (a-1) and the solution (b-1) are separately and simultaneously supplied to the reaction vessel. In the present specification, the term "simultaneously" means that the periods of time supplying the solution (a-1) and the solution (b-1) to a reaction vessel overlap, or means that the supply of the solution (a-1) and the supply of solution (b-1) to a reaction vessel are concurrently started. The supply of the solution (a-1) and the supply of solution (b-1) to the reaction vessel are preferably simultaneously completed, but can be slightly different.

The solutions simultaneously supplied to the reaction vessel are preferably stirred in the reaction vessel. The rate of stirring and the like can be adjusted based on the size of the reaction vessel, the amount of each of the solutions supplied to the reaction vessel and the like.

The sulfite is preferably contained in the solution (b-1), such that the equivalent ratio of sulfite ions to the total of M1 and M2 in the solution (a-1) is in a range of 1.01 to 1.30 in the step of obtaining the powder. When the sulfite is contained in the solution (b-1) so that the equivalent ratio of sulfite ions to the total of M1 and M2 is in a range of 1.01 to 1.30, the sulfite ions are not greatly excessive with respect to the total of M1 and M2 when the solutions are simultaneously supplied to the reaction vessel, the reaction among the M1 ions, the M2 ions and the sulfite ions can proceed at a proper rate. As a result, a powder of a sulfite containing strontium and europium having a large particle diameter can be obtained.

The equivalent ratio of sulfite ions to the total of M1 and M2 means the ratio of the number of moles of sulfite ions to the total number of moles of the element M1 and the element M2.

Pre-step (B'): Prior to Step (B) of Obtaining Powder

Prior to the step (B) of obtaining a powder, a step (B') of preparing a solution (b-2) containing a sulfite that provides sulfite ions at an equivalent ratio of 0.2 or less, particularly preferably 0.12 or less, with respect to the total of M1 and M2 in the reaction vessel is preferably performed.

Although the content of the sulfite in the solution (b-2) can be appropriately adjusted so as not to significantly affect the pH of the reaction system, and it is preferable that the equivalent ratio of sulfite ions to the total of M1 and M2 is 0.05 or greater. With the step (B') of preparing the solution (b-2) containing a sulfite in a reaction vessel, in the subsequent step (B), the solution (a-1) and the solution (b-1) are simultaneously supplied to a reaction vessel that contains the solution (b-2), without a significant change in the pH of the reaction system, so that the M1 ions, the M2 ions, and the sulfite ions can be stably reacted at a proper rate.

The pH of the solution (b-2) is preferably adjusted in a range of 7.0 to 8.0. With the pH of the solution (b-2) adjusted in the range of 7.0 to 8.0, in the subsequent step (B) of obtaining a powder, the pH does not significantly change in the reaction system in which the solution (a-1) and the solution (b-1) are simultaneously supplied to the reaction vessel to cause a reaction. Consequently, the M1 ions, the M2 ions, and the sulfite ions can be stably reacted at a proper rate.

In the reaction system in which the solution (a-1) and the solution (b-1) are simultaneously supplied to a reaction vessel to cause a reaction, the pH of the reaction system is adjusted preferably in a range of 5.0 to 8.5, more preferably in a range of 5.0 to 6.0. With a pH of the reaction system of 5.0 or greater, a powder of a sulfite containing M1 and M2 can be obtained without reduction in the precipitation efficiency of the powder of a sulfite containing M1 and M2. With a pH of the reaction system of 8.0 or less, the reaction among M1 ions, M2 ions, and sulfite ions proceeds at a proper rate, so that a powder of a sulfite containing M1 and M2 with a large particle diameter can be obtained. With a pH adjusted at 6.0 or less, among, the reaction proceeds at a more proper rate, so that a powder of a sulfite containing M1 and M2 with a larger particle diameter can be obtained.

In the reaction system in which the solution (a-1) and the solution (b-1) are simultaneously supplied to a reaction vessel to cause a reaction, the temperature of the reaction system is preferably in a range of 15 to 30° C., more preferably in a range of 15 to 20° C. With a temperature of the reaction system of 15° C. or higher, the powder of a sulfite containing M1 and M2 tends to more easily precipitate. With a temperature of the reaction system of 30° C. or lower, the reaction among M1 ions, M2 ions and sulfite ions proceeds at a proper rate, so that a powder of a sulfite containing M1 and M2 with a large particle diameter can be obtained. With a temperature of 20° C. or lower, among, a powder of a sulfite containing M1 and M2 with a larger particle diameter can be obtained.

The time required for supplying each of the solutions to a reaction vessel and the reaction time are not limited, depending on the total amount of the reaction system and the like.

In the step (B), after completion of the supply of the solution (a-1) and the solution (b-1) to a reaction vessel, the resulting precipitate of a sulfite containing M1 and M2 can be filtered off, dehydrated, dried, and dry sieved to obtain a powder of a sulfite containing M1 and M2.

Step (C): Obtaining A Thiogallate-Based Fluorescent Material

The step (C) is a step of obtaining a thiogallate-based fluorescent material from the powder obtained in the step (B). For example, the powder of a sulfite containing M1 and M2 obtained in the step (B) and powder of a gallium compound in an amount allowing the thiogallate-based fluorescent material having a desired composition to be obtained can be mixed to fire the mixed powder to obtain the thiogallate-based fluorescent material. Alternatively, powder of a gallium compound in an amount allowing the thiogallate-based fluorescent material having a desired composition to be obtained can be added to the reaction system of the step (B) to obtain a mixed powder of the powder of a sulfite containing M1 and M2 and powder of a gallium compound, to fire the mixed powder to obtain the thiogallate-based fluorescent material.

The gallium powder may be a compound containing gallium, and examples thereof include an oxide, a carbonate, and a sulfide of gallium.

The method of mixing the powder of a sulfite containing M1 and M2 with powder of a gallium compound is not particularly limited, and, for example, the compounds each can be uniformly mixed with a super mixer manufactured by KAWATA MFG. Co., Ltd., so as to obtain the mixed powder.

The firing temperature of the mixed powder is not particularly limited, and the mixed powder having a predetermined composition may be fired at a temperature of 850° C. or higher, particularly preferably 900° C. or higher, under a hydrogen sulfide atmosphere, so as to efficiently manufacture fluorescent material particles having a desired composition with a large particle diameter. The upper limit of the firing temperature is, for example, lower than the melting point of the fluorescent material particles, variable depending on the composition of fluorescent material particles, preferably 1200° C. or lower, more preferably 1100° C. or lower.

Preferably firing is performed under a hydrogen sulfide ($H_2S$) atmosphere. Any firing atmosphere containing at least hydrogen sulfide may be used, and the firing atmosphere may contain a gas other than hydrogen sulfide on an as needed basis. Examples of the gas other than hydrogen sulfide include an inert gas such as nitrogen and carbon disulfide ($CS_2$). The hydrogen sulfide concentration in the hydrogen sulfide atmosphere in which the mixed powder is fired is, for example, 90% by volume or greater, preferably 95% by volume or greater, though not particularly limited.

The pressure condition under which the mixed powder is fired may be set at, for example, in a range of 0.1 to 0.3 MPa, though not particularly limited. The pressure condition is set preferably at 0.1 MPa (normal pressure). The reason is that the excessively high pressure in an apparatus for heating the mixed powder may cause, for example, a risk of leakage of hydrogen sulfide from the inside of the apparatus to the external environment.

The firing time of the mixed powder is not particularly limited as long as desired fluorescent material particles can be obtained. The heating time at the heating temperature (maximum temperature) is, for example, 1 to 20 hours, preferably 1 to 10 hours.

A method of producing a thiogallate-based fluorescent material in a second exemplary embodiment of the present disclosure includes:

a step (D) of preparing a solution (a-2) containing at least one element M1 selected from the group consisting of strontium, beryllium, magnesium, calcium, barium and zinc, a solution (a-3) containing at least one element M2 selected from the group consisting of europium and cerium, and a solution (b-1) containing a sulfite;

a step (E) of simultaneously supplying the solution (a-2), the solution (a-3), and the solution (b-1) to a reaction vessel and causing a reaction in a reaction system to obtain a powder of a sulfite containing M1 and M2; and a step (F) of obtaining the thiogallate-based fluorescent material from the resulting powder of a sulfite containing M1 and M2.

Step (D): Preparing Solution

The step (D) is performed in the same manner as in the first embodiment, except that a solution (a-2) containing at least one element M1 selected from the group consisting of strontium, beryllium, magnesium, calcium, barium and zinc, and a solution (a-3) containing at least one element M2 selected from the group consisting of europium and cerium are prepared.

Solution (a-2)

The solution (a-2) may be prepared from the same compound as the compound containing M1 for use in the solution (a-1) in the first embodiment and the same solvent. The M1 content is appropriately adjusted in a range in which the compound containing M1 is practically dissolved in the solvent. For example, when the compound containing M1 is $SrCl_2$ as and the solvent is pure water, the M1 content in the solution (a-2) is adjusted in a range of 10.0 to 20.0% by mass.

Solution (a-3)

The solution (a-3) may be prepared from the same compound as the compound containing M2 for use in the solution (a-1) and the same solvent. The M2 content is appropriately adjusted in the range in which the compound containing M2 is practically dissolved in the solvent. For example, when the compound containing M2 is $EuCl_3$ and the solvent is pure water, the M2 content in the solution (a-3) is adjusted in a range of 0.5 to 8.0% by mass.

Step (E): Obtaining Powder

The step (E) of obtaining a powder is performed in the same manner as in the first embodiment, except that the solution (a-2) and the solution (a-3) are used instead of the solution (a-1).

Step (F): Obtaining A Thiogallate-Based Fluorescent Material

The step (F) is performed in the same manner as in the first embodiment, except that the powder obtained in the step (E) is used.

Post Processing Step (G)

The method of producing a thiogallate-based fluorescent material in the first embodiment or the second embodiment may include a post processing step of obtaining the thiogallate-based fluorescent material through wet dispersion, wet sieving, dehydration, drying, and dry sieving after firing of the thiogallate-based fluorescent material.

Sulfite for Thiogallate-Based Fluorescent Material

A sulfite for a thiogallate-based fluorescent material in a third embodiment of the present disclosure is described as follows.

The sulfite for a thiogallate-based fluorescent material may be the powder of a sulfite containing M1 and M2 obtained through the step of preparing solution with M1 which is at least one selected from the group consisting of strontium, beryllium, magnesium, calcium, barium and zinc, and M2 which is at least one selected from the group consisting of europium and cerium, and the step of obtaining the powder in the method of producing a thiogallate-based fluorescent material in the first embodiment or the second embodiment of the present disclosure. Among, with M1 which is at least one selected from the group consisting of strontium, calcium and barium, and with M2 which is europium, the resulting sulfite containing M1 and M2 can be used as the sulfite for a thiogallate-based fluorescent material to obtain the thiogallate-based fluorescent material having high luminance.

The powder of a sulfite for a thiogallate-based fluorescent material has an average particle diameter (hereinafter referred to as D1) measured by the F. S. S. S. (Fisher Sub Sieve Sizer) method of 1.5 µm or greater, and a ratio of the average particle diameter for 50% of the volume-based cumulative particle size distribution (hereinafter referred to as D2) determined by the coulter counter method to the average particle diameter measured by the F. S. S. S. method (hereinafter referred to as a ratio D2/D1) in a range of 1 or greater and 2.5 or less.

The powder of a sulfite for a thiogallate-based fluorescent material includes secondary particles consisting of aggregates of primary particles. The particle diameter D1 measured by the F. S. S. S. (Fisher Sub Sieve Sizer) method is an average of the particle diameter of primary particles based on the measurement of the specific area by the air permeability method.

The particle diameter D2 measured by the coulter counter method is the average particle diameter for 50% of the volume-based cumulative particle size distribution, which is an average of the particle diameter of the secondary particles.

When sulfite ions, M1 ions, and M2 ions are simultaneously supplied at for a reaction in a state with nearly equivalent amounts such as in the first embodiment and the second embodiment, the growth of primary particles created takes priority over the creation of primary particles, due to the proper reaction rate. Consequently, dense secondary particles consisting of aggregates of large primary particles are formed. The secondary particles obtained have a D1 of 1.5 µm or greater, and a small D2 due to the dense structure, resulting in the ratio of D2/D1 in a range of 1 or greater and 2.5 or less. Since the obtained primary particles of the powder of a sulfite containing M1 and M2 are large and dense, it is conceivable that the thiogallate-based fluorescent material obtained after firing has high luminance with large particle diameter.

In contrast, as in a conventional method, when a reaction system contains either sulfite ions or M1 and M2 ions in a greatly excessive amount, supplying the other ions of either sulfite ions or M1 and M2 ions to the reaction system to cause a reaction allows the creation of many primary particles to take priority, due to excessively high reaction rate resulting from the greatly excessive amount of either the anions or the cations. In general, small particles tend to cause aggregation. The primary particles, therefore, cause aggregation before the growth of particles, so that secondary particles consisting of aggregates of small primary particles having many voids are formed. The secondary particles obtained have a D1 of less than 1.5 due to the small primary particles, and a large D2 due to the many aggregates gathered, resulting in the ratio D2/D1 in a range of greater than 2.5. Since the obtained primary particles of the powder of a sulfite containing M1 and M2 are small and have many voids, it is conceivable that the thiogallate-based fluorescent material obtained after firing has low luminance with small particle diameter.

The powder of a sulfite for a thiogallate-based fluorescent material has a standard deviation of volume-based particle size distribution measured by the coulter counter method of preferably 0.5 or less, more preferably 0.4 or less, still more preferably 0.3 or less.

When sulfite ions, M1 ions, and M2 ions are simultaneously supplied for a reaction in a state with nearly equivalent amounts, the growth of primary particles takes priority over the creation of many primary particles, due to the proper reaction rate between the anions and the cations. Consequently, secondary particles consisting of primary particles with large particle diameter are formed, with a uniform shape, resulting in a standard deviation of the particle size distribution of 0.5 or less.

Thiogallate-Based fluorescent material

A powder of a sulfite containing M1 and M2 obtained from the manufacturing method in the first embodiment or the second embodiment, and the thiogallate-based fluorescent material obtained from the sulfite for a thiogallate-based fluorescent material in the third embodiment of the present disclosure are preferably represented by the following general formula:

$(M1_{1-x}M2_x)Ga_{2-y}S_{4-z}$ wherein M1 represents at least one element selected from the group consisting of strontium, beryllium, magnesium, calcium, barium and zinc, M2 represents at least one element selected from the group consisting of europium and cerium, and x, y and z satisfy $0.03 \leq x \leq 0.25$, $-0.2 \leq y \leq 0.2$, and $-0.2 \leq z \leq 0.2$. In the general formula, with x in a range of $0.03 \leq x \leq 0.25$, y in a range of $-0.2 \leq y \leq 0.2$, and z in a range of $-0.2 \leq z \leq 0.2$, sufficient luminance can be obtained when the thiogallate-based fluorescent material is excited by a blue light emitting element.

The thiogallate-based fluorescent material represented by the general formula has an emission peak in a range of 510 to 550 nm, when irradiated with light having a wavelength in a range of 420 to 480 nm from an excitation light source.

The thiogallate-based fluorescent material of the present disclosure has a D1 of preferably 3.5 µm or greater, more preferably 5.0 µm or greater, still more preferably 6.0 µm or greater. With a D1 of 3.5 µm or greater, sufficient luminance can be obtained, when the thiogallate-based fluorescent material is excited by a blue light emitting element.

The thiogallate-based fluorescent material obtained by the present disclosure may be used for a light emitting device including the thiogallate-based fluorescent material as components of a conversion member and an excitation light source.

EXAMPLES

The present disclosure will be more specifically described by way of Examples, but the present disclosure will not be limited to these Examples.

Example 1

Step (A) of Preparing Solution

A 2700 g of strontium chloride (SrCl$_2$) solution containing 16% by mass of strontium (Sr) and a 320 g of europium chloride (EuCl$_3$) solution containing 10% by mass of europium (Eu) were mixed with pure water, so that a solution (a-1) in a total amount of 3 L was prepared. The solution (a-1) had a pH of 0.8 and a temperature of 25° C. In order to achieve an equivalent ratio of sulfite ions (mol) relative to the total amount of 1.00 of strontium and europium (Sr (mol)+Eu (mol)) of 1.15, 1000 g of ammonium sulfite (NH$_4$)$_2$SO$_3$ (manufactured by Wako Pure Chemical Industries, Ltd.) was dissolved in pure water, so that a solution (b-1) in a total amount of 3.36 L was prepared. The solution (b-1) had a pH of 8 and a temperature of 20° C.

Pre-step (B') Prior to Step of Obtaining Powder

Into a reaction vessel with a capacity of 50 L, 4 L of pure water and 0.36 L of the solution (b-1) as a solution (b-2) were supplied. The solution (b-2) had an equivalent ratio of sulfite ions (mol) relative to the total amount of 1.00 (mol) of strontium and europium of 0.12. The mixed solution of pure water and the solution (b-2) had a pH of 8.

Step (B) of Obtaining Powder

The mixed solution of pure water and the solution (b-2) in the reaction vessel was stirred by a stirrer (stirring blade shape: pitched paddle, revolution: 150 rpm). While the mixed solution in the reaction vessel was stirred, each of the solution (a-1) and the solution (b-1) was separately and simultaneously dripped into the reaction vessel, at a rate of 100 mL/min, using a tube-type quantitative pump (MASTERFLEX manufactured by YAMATO SCIENTIFIC Co., Ltd.). The pH of the reaction system in the reaction vessel was adjusted to 8.1 with ammonium hydroxide (NH$_4$OH). Each of the solution (a-1) and the solution (b-1) was separately and simultaneously dripped into the reaction vessel over 30 minutes, and the reaction was completed in parallel with the completion of the supply to the reaction solution. The reaction system had a temperature (liquid temperature) of 29° C. The sulfite (Sr, Eu)SO$_3$ for a thiogallate-based fluorescent material precipitated in the reaction system was separated by filtering off, dried, and then classified through a dry sieve.

Step (C) of Obtaining Thiogallate-Based Fluorescent Material and Post Processing Step (G)

The resulting powder of sulfite (Sr, Eu)SO$_3$ for a thiogallate-based fluorescent material and a gallium oxide (Ga$_2$O$_3$) powder were mixed such that the twice the total molar amount of strontium and europium relative to gallium (mol) satisfies 0.95(2×(Sr(mol)+Eu(mol))/Ga(mol)=0.95). The mixture was put in a quartz crucible and fired in a tubular furnace under a hydrogen sulfide atmosphere with a hydrogen sulfide (HO concentration of 95% by volume or greater at 0.1 MPa (normal pressure), at 900° C. for 2 hours so as to obtain a thiogallate-based fluorescent material. After firing, the resulting fired material was wet-dispersed with pure water, dried, and then classified through a dry sieve so as to obtain the thiogallate-based fluorescent material (Sr$_{0.96}$Eu$_{0.04}$)Ga$_2$S$_4$ in Example 1.

Example 2

In the step (A) of preparing solution, the pH of the solution (b-1) was adjusted to 7.5 with hydrochloric acid (HCl).

In the step (B) of obtaining a powder, the pH of the reaction system was adjusted to 5.5 with hydrochloric acid (HCl). In the step (B) of obtaining a powder, while each of the solution (a-1) and the solution (b-1) was separately and simultaneously dripped into the reaction vessel, the pH of the reaction system was adjusted to 5.5±0.5. The reaction system had a temperature of 26° C. Except that 0.36 L of the solution (b-1) with a pH adjusted to 7.5 and 0.36 L of the solution (b-1) as the solution (b-2) were used, and the reaction system had a pH of 5.5, the thiogallate-based fluorescent material (Sr$_{0.96}$Eu$_{0.04}$)Ga$_2$S$_4$ in Example 2 was obtained in the same manner as in Example 1.

Example 3

In the step (A) of preparing solution, the pH of the solution (b-1) was adjusted to 7.5 with hydrochloric acid (HCl). In the pre-step (B') prior to the step of obtaining the powder, 0.36 L of the solution (b-1) was used as the solution (b-2), and the temperature of the mixed solution of 4 L of pure water and 0.36 L of the solution (b-2) was adjusted to 18° C. with ice made from pure water. In the step (B) of obtaining a powder, while each of the solution (a-3) and the solution (b-1) was separately and simultaneously dripped into the reaction vessel, the temperature of the reaction system was adjusted to 20±5° C. In the step (B) of obtaining a powder, the pH of the reaction system was adjusted to 5.5 with hydrochloric acid. In the step (B) of obtaining a powder, while each of the solution (a-3) and the solution (b-1) was separately dripped, the pH of the reaction system was adjusted to 5.5±0.5. Except that, in the step (B) of obtaining a powder, the pH of the reaction system was adjusted to 5.5, and the temperature of the reaction system was adjusted to 18° C., the thiogallate-based fluorescent material $(Sr_{0.96}Eu_{0.04})Ga_2S_4$ in Example 3 was obtained in the same manner as in Example 1.

Comparative Example 1

Except that, in the step of obtaining the powder, 4 L of pure water and 3.36 L of the solution (b-1) were fed into a reaction vessel having a capacity of 50 L, and while the mixed solution of pure water and the solution (b-1) in the reaction vessel was stirred by a stirrer (stirring blade shape: pitched paddle, revolution: 150 rpm), the solution (a-1) was dripped into the mixed solution in the reaction vessel at a rate of 100 mL/min over 30 minutes with a tube-type quantitative pump (MASTERFLEX manufactured by YAMATO SCIENTIFIC Co., Ltd.), the thiogallate-based fluorescent material $(Sr_{0.96}Eu_{0.04})Ga_2S_4$ in Comparative Example 1 was obtained in the same manner as in Example 1. The reaction system had a pH of 6.6 and a temperature of 25° C.

Comparative Example 2

Except that, in the step of obtaining the powder, 4 L of pure water and 3 L of the solution (a-1) were fed into a reaction vessel having a capacity of 50 L, and while the mixed solution of pure water and the solution (a-1) in the reaction vessel was stirred by a stirrer (stirring blade shape: pitched paddle, revolution: 150 rpm), the solution (b-1) was dripped into the mixed solution in the reaction vessel at a rate of 100 mL/min over 34 minutes with a tube-type quantitative pump (MASTERFLEX manufactured by YAMATO SCIENTIFIC Co., Ltd.), the thiogallate-based fluorescent material $(Sr_{0.96}Eu_{0.04})Ga_2S_4$ in Comparative Example 2 was obtained in the same manner as in Example 1. The reaction system had a pH of 6.9 and a temperature of 25° C.

Evaluation

The powders of a sulfite for a thiogallate-based fluorescent material and the thiogallate-based fluorescent material powders after passing through a dry sieve in Examples and Comparative Examples were evaluated by the following method. The results are shown in Table 1.

Average Particle Diameter

The average particle diameter (μm) of the powders of a sulfite for a thiogallate-based fluorescent material and the thiogallate-based fluorescent material powders in Examples and Comparative Examples were measured by the Fisher Sub Sieve Sizer method, using a Fisher Sub-Sieve Sizer Model 95 (manufactured by Fisher Scientific Company).

Volume-Based 50% Average Particle Diameter

The ratio of the 50% average particle diameter (μm) based on a volume-based cumulative particle size distribution and the standard deviation (σlog) of the volume-based particle size distribution of the powders of a sulfite for a thiogallate-based fluorescent material and the thiogallate-based fluorescent material powders in Examples and Comparative Examples were measured by the coulter counter method using a particle size distribution measurement apparatus (product name: CMS, manufactured by Coulter Counter).

Relative Luminance

The relative luminance of the thiogallate-based fluorescent materials in Examples and Comparative Examples was measured. The relative luminance was represented in terms of relative value (%) to the luminance in Comparative Example 1 as reference, based on the measurement of the luminance of each of the fluorescent materials at room temperature (25° C.±5° C.) for the reflection of the light from an excitation light source having an excitation wavelength of 460 nm, using a fluorescence spectrophotometer (product name: F-4500, manufactured by Hitachi High-Tech Science Corporation).

Reflectance at 460 nm

The reflectance of each of the thiogallate-based fluorescent materials in Examples and Comparative Examples at room temperature (25° C.±5° C.) was measured for the reflection of the light from an excitation light source having an excitation wavelength of 460 nm, using a fluorescence spectrophotometer (product name: F-4500, manufactured by Hitachi High-Tech Science Corporation).

SEM Image

Figure 1A:
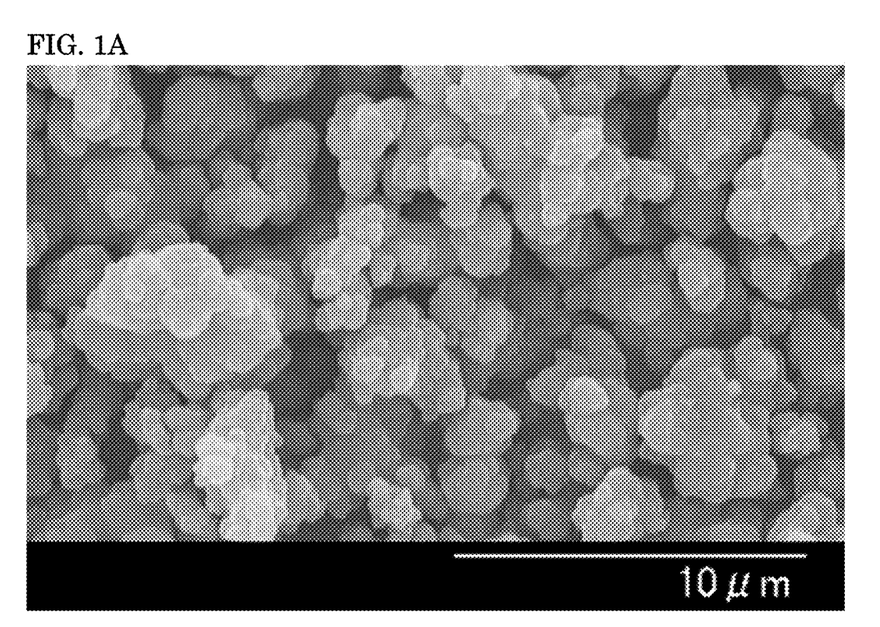
FIG. 1A is an SEM image of a powder of a sulfite for a thiogallate-based fluorescent material in Example 1.
Figure 1B:
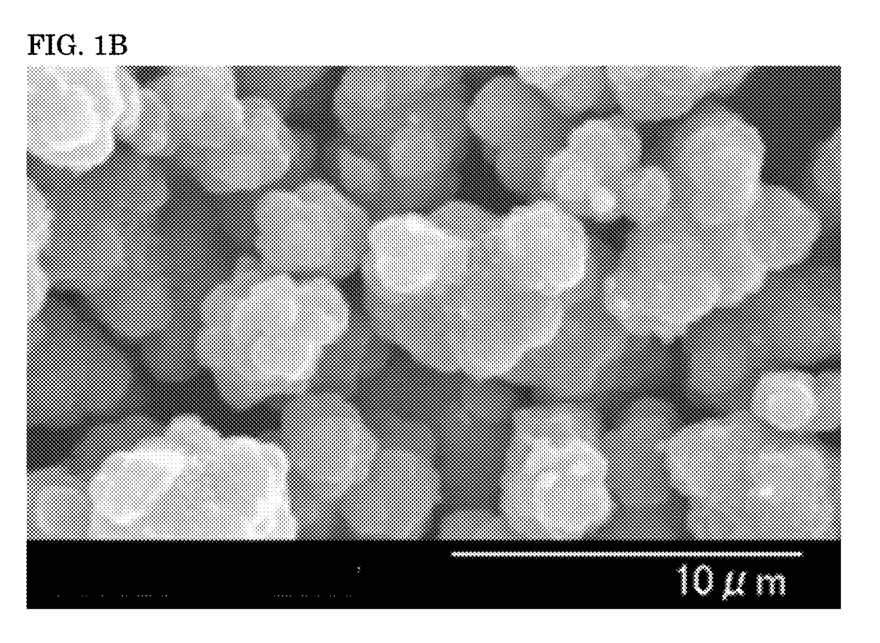
FIG. 1B is an SEM image of a powder of a sulfite for a thiogallate-based fluorescent material in Example 2.
Figure 1C:
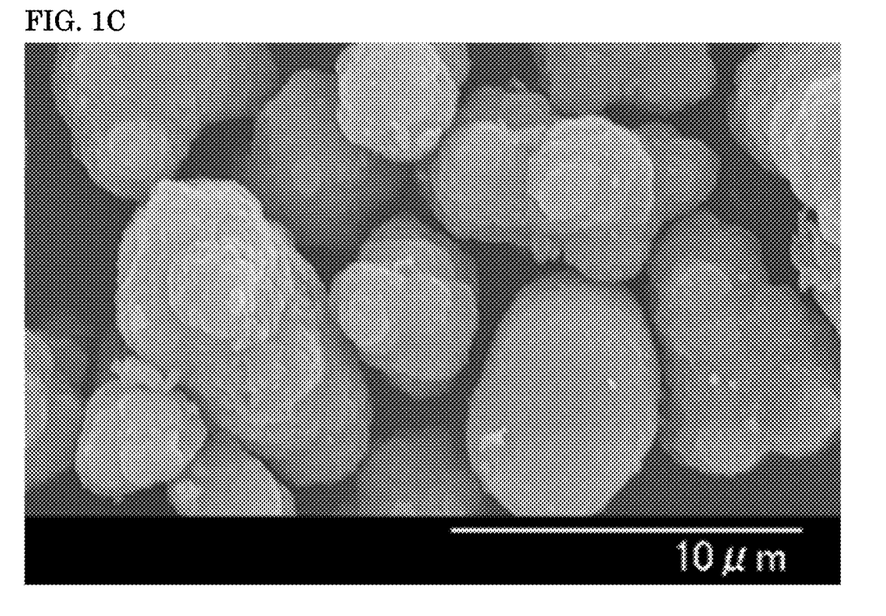
FIG. 1C is an SEM image of a powder of a sulfite for a thiogallate-based fluorescent material in Example 3.
Figure 1D:
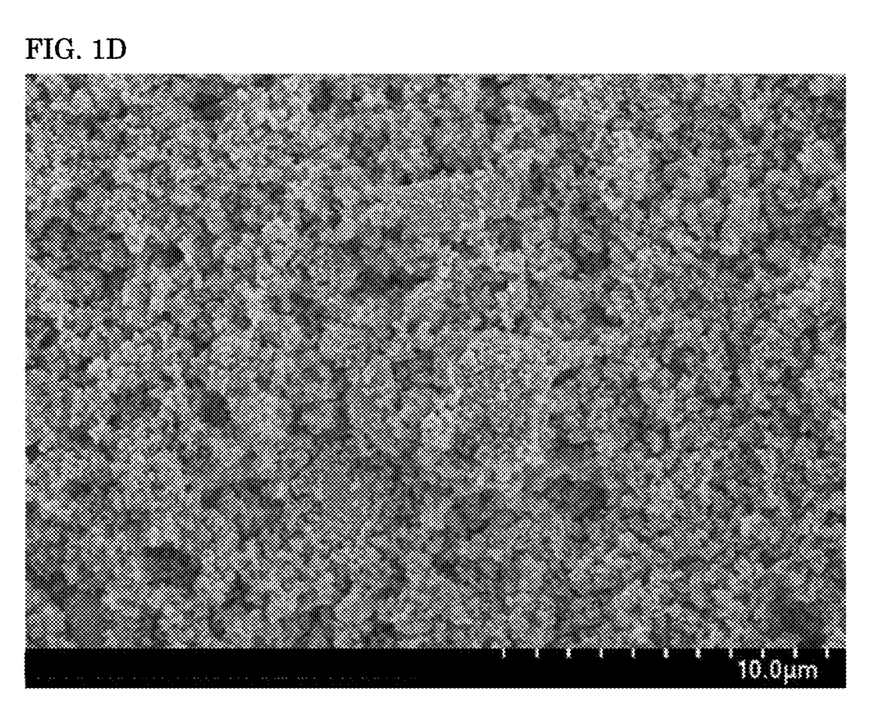
FIG. 1D is an SEM image of a powder of a sulfite for a thiogallate-based fluorescent material in Comparative Example 1.
Figure 1E:
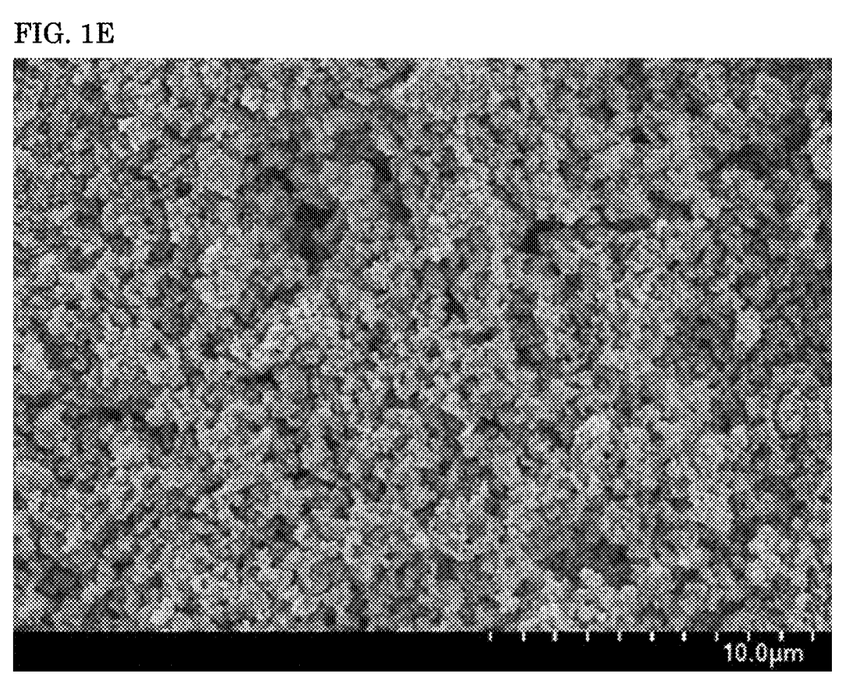
FIG. 1E is an SEM image of a powder of a sulfite for a thiogallate-based fluorescent material in Comparative Example 2.
Figure 2A:
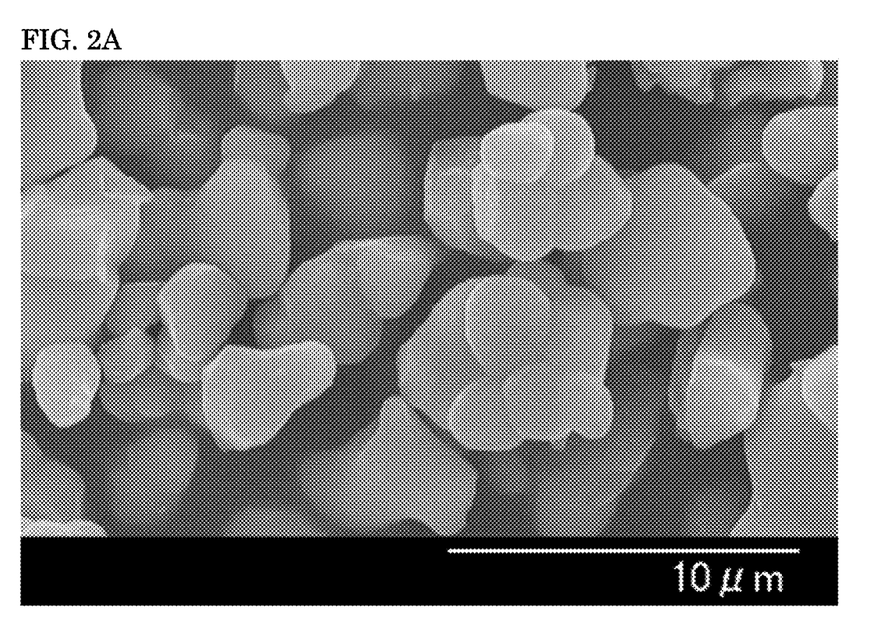
FIG. 2A is an SEM image of a thiogallate-based fluorescent material powder in Example 1.
Figure 2B:
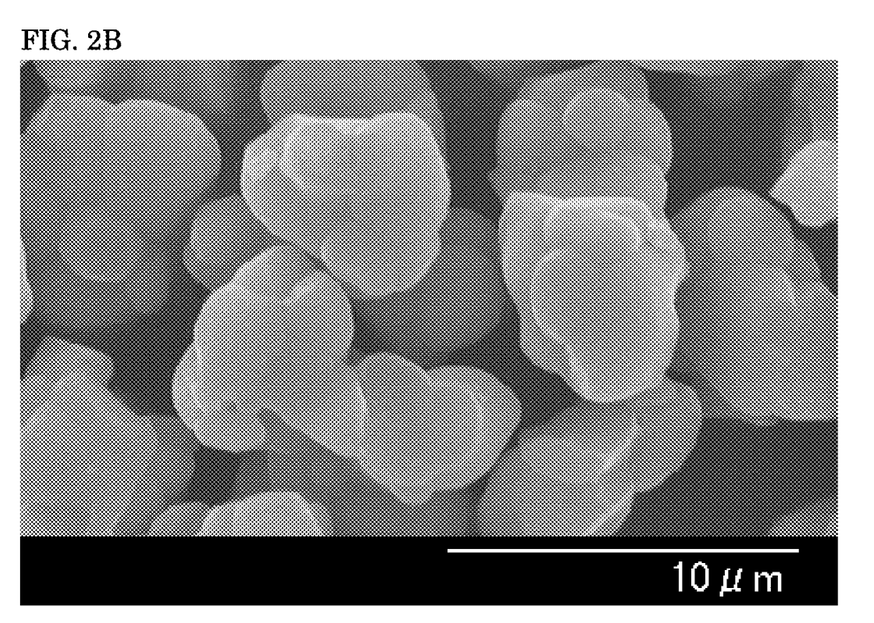
FIG. 2B is an SEM image of a thiogallate-based fluorescent material powder in Example 2.
Figure 2C:
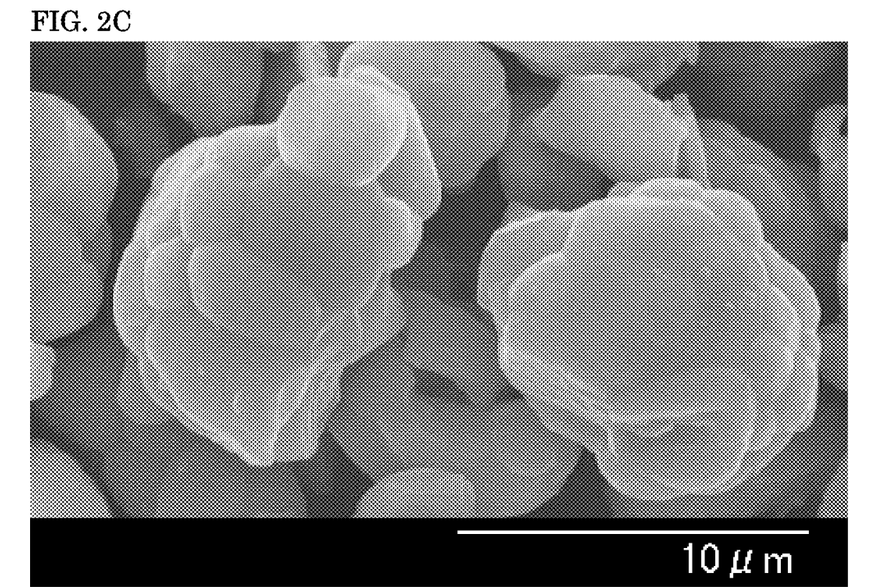
FIG. 2C is an SEM image of a thiogallate-based fluorescent material powder in Example 3.
Figure 2D:
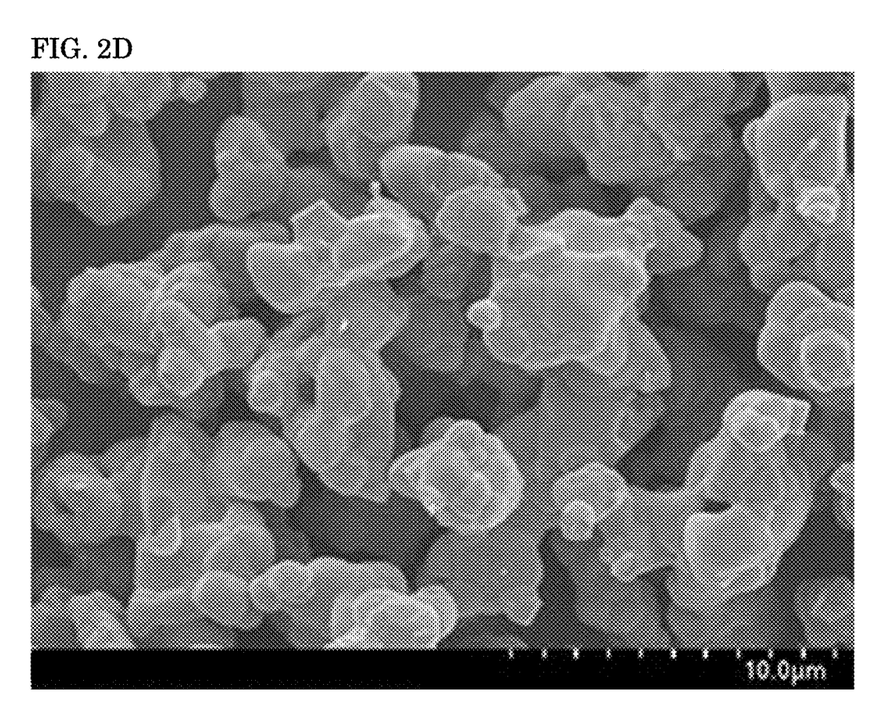
FIG. 2D is an SEM image of a thiogallate-based fluorescent material powder in Comparative Example 1.
Figure 2E:
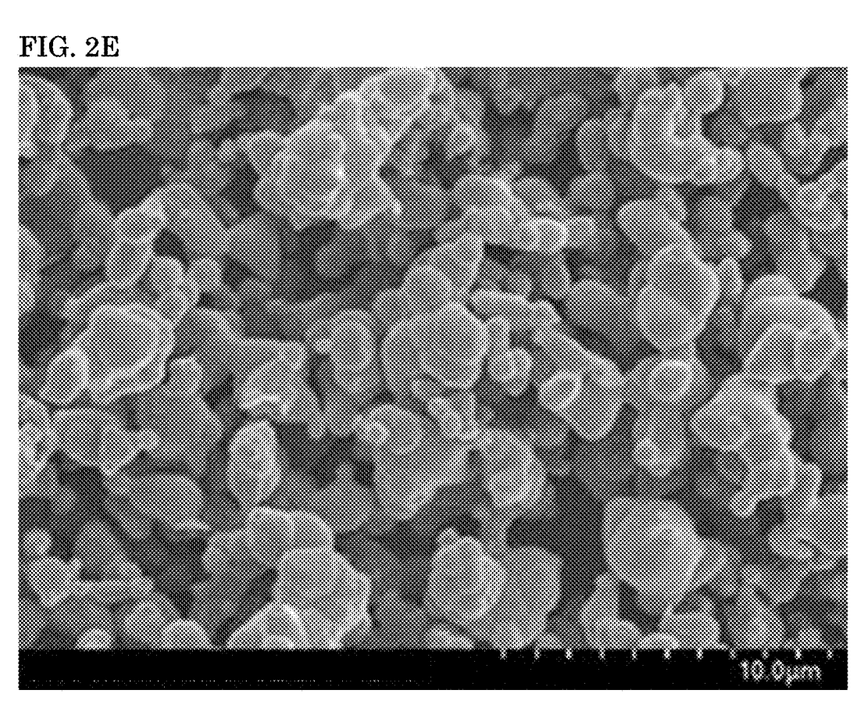
FIG. 2E is an SEM image of a thiogallate-based fluorescent material powder in Comparative Example 2.

The SEM images of the powders of a sulfite for a thiogallate-based fluorescent material before passing through a dry sieve and the thiogallate-based fluorescent material powders after passing through a dry sieve in Examples and Comparative Examples were obtained using a scanning electron microscope (SEM). The SEM images of the sulfite (Sr, Eu)SO₃ for a thiogallate-based fluorescent material are shown in FIG. 1A for Example 1, in FIG. 1B for Example 2, in FIG. 1C for Example 3, in FIG. 1D for Comparative Example 1, and in FIG. 1E for Comparative Example 2, respectively. The SEM images of the thiogallate-based fluorescent material $(Sr_{0.96}Eu_{0.04})Ga_2S_4$ are shown in FIG. 2A for Example 1, in FIG. 2B for Example 2, in FIG. 2C for Example 3, in FIG. 2D for Comparative Example 1, and in FIG. 2E for Comparative Example 2, respectively.

TABLE 1

| | Sulfite containing strontium and europium (Sr, Eu)SO₃ | | | | | | Thiogallate-based fluorescent material $(Sr_{0.96}Eu_{0.04})Ga_2S_4$ (B) | | | | |
|---|---|---|---|---|---|---|---|---|---|---|---|
| | (A) Average particle diameter F.S.S.S. (μm) | (B) Volume average particle diameter Dm (μm) | (B)/(A) | σlog | pH of reaction system | Temperature of reaction system (° C.) | Manufacturing method | (A) Average particle diameter F.S.S.S. (μm) | Volume average particle diameter Dm (μm) | (B)/(A) | Relative luminance Y (%) | Reflectance (%) at 460 nm |
| Example 1 | 1.7 | 4.0 | 2.4 | 0.281 | 8.1 | 29 | (a-1) and (b-1) simultaneously dripped | 4.1 | 5.6 | 1.4 | 104.8 | 28.6 |

TABLE 1-continued

| | Sulfite containing strontium and europium (Sr, Eu)SO$_3$ | | | | | | Thiogallate-based fluorescent material $(Sr_{0.96}Eu_{0.04})Ga_2S_4$ (B) | | | | |
|---|---|---|---|---|---|---|---|---|---|---|---|
| | (A) Average particle diameter F.S.S.S. (μm) | (B) Volume average particle diameter Dm (μm) | (B)/(A) | σlog | pH of reaction system | Temperature of reaction system (°C.) | Manufacturing method | (A) Average particle diameter F.S.S.S. (μm) | Volume average particle diameter Dm (μm) | (B)/(A) | Relative luminance Y (%) | Reflectance (%) at 460 nm |
| Example 2 | 2.6 | 4.8 | 1.8 | 0.215 | 5.5 | 26 | (a-1) and (b-1) simultaneously dripped | 5.2 | 6.4 | 1.2 | 112.4 | 24.6 |
| Example 3 | 3.5 | 6.9 | 2.0 | 0.279 | 5.5 | 18 | (a-1) and (b-1) simultaneously dripped | 6.2 | 7.8 | 1.3 | 114.1 | 22.3 |
| Comparative Example 1 | 0.7 | 9.7 | 13.9 | 0.674 | 6.6 | 25 | (a-1) dripped into (b-1) | 3.0 | 4.8 | 1.6 | 100.0 | 32.3 |
| Comparative Example 2 | 0.7 | 7.3 | 10.4 | 0.551 | 6.9 | 25 | (b-1) dripped into (a-1) | 2.8 | 4.3 | 1.5 | 99.1 | 33.0 |

As shown in Table 1 and FIG. 1, the powders of a sulfite for a thiogallate-based fluorescent material in Examples 1 to 3 obtained by supplying the solution (a-1) and the solution (b-1) separately and simultaneously into a reaction vessel had less variation in the particle diameter, a larger average particle diameter, and a more uniform particle diameter than the powders of a sulfite for a thiogallate-based fluorescent material in Comparative Examples 1 and 2. As shown in FIG. 2, the thiogallate-based fluorescent materials in Examples 1 to 3 manufactured from the sulfite for a thiogallate-based fluorescent material had a large average particle diameter with a uniform particle diameter. As shown in Table 1, the thiogallate-based fluorescent materials in Examples 1 to 3 had enhanced relative luminance. The thiogallate-based fluorescent materials in Examples 1 to 3 had lower reflectance of light having a wavelength of 460 nm than the thiogallate-based fluorescent materials in Comparative Examples 1 and 2. In other words, the increase in light absorptance of the thiogallate-based fluorescent materials in Examples 1 to 3 was confirmed. In Examples 1 to 3, the average particle diameter of the thiogallate-based fluorescent materials increased as the average particle diameter of the sulfite for a thiogallate-based fluorescent material increased. The relative luminance was enhanced as the average particle diameter of thiogallate-based fluorescent material increased.

In contrast, as shown in Table 1 and FIG. 1, the sulfite for a thiogallate-based fluorescent material in Comparative Examples 1 and 2 obtained by supplying the solution (b-1) to the solution (a-1) or supplying the solution (a-1) to the solution (b-1) had a smaller average particle diameter and more variation in the particle diameter than those in Examples 1 to 3. As shown in FIG. 2, the thiogallate-based fluorescent materials in Comparative Examples 1 and 2 manufactured from the sulfite for a thiogallate-based fluorescent material had a smaller average particle diameter and more variation in the particle diameter than those in Examples 1 to 3. As shown in Table 1, the thiogallate-based fluorescent materials in Comparative Examples 1 and 2 had lower relative luminance than those in Examples 1 to 3.

The thiogallate-based fluorescent material obtained by the manufacturing method of the present disclosure has a large average particle diameter and improved luminance, the luminance being susceptible to the average particle diameter. The thiogallate-based fluorescent material can be used together with a light emitting element which is an excitation light source in a light emitting device for use in white light emitting lighting, vehicle lighting, a display, a liquid crystal display back lighting and the like, and is therefore industrially useful. The sulfite for a thiogallate-based fluorescent material according to the present disclosure has a large average particle diameter and can be used as raw material or an intermediate product for manufacturing a thiogallate-based fluorescent material with improved luminance. The sulfite is therefore industrially useful.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method of producing a thiogallate-based fluorescent material, comprising:
    preparing a first solution containing at least one element M1 selected from the group consisting of strontium, beryllium, magnesium, calcium, barium and zinc, and at least one element M2 selected from the group consisting of europium and cerium, and a second solution containing a sulfite;
    simultaneously supplying the first solution and the second solution to a reaction vessel and causing a reaction in a reaction system to obtain a powder of a sulfite containing M1 and M2 and not containing gallium; and
    obtaining the thiogallate-based fluorescent material from the resulting powder of a sulfite containing M1 and M2 and not containing gallium,
    wherein M1 contains at least strontium and optionally contains at least one element selected from the group consisting of beryllium, magnesium, calcium, barium, and zinc,
    wherein M2 contains at least europium and optionally contains cerium,
    wherein in obtaining the powder, a pH of the reaction system is adjusted in a range of 5.0 to 6.0, and
    wherein obtaining the thiogallate-based fluorescent material comprises mixing the powder of the sulfite containing M1 and M2 and not containing gallium and a powder of a gallium compound to obtain a mixed powder and firing the mixed powder.

2. The method of producing a thiogallate-based fluorescent material according to claim 1, wherein the thiogallate-based fluorescent material is represented by a formula:

$$(M1_{1-x}M2_x)Ga_{2-y}S_{4-z}$$

wherein M1 contains at least strontium and optionally contains at least one element selected from the group consisting of beryllium, magnesium, calcium, barium, and zinc, and
wherein M2 contains at least europium and optionally contains cerium, and
wherein x, y and z satisfy $0.03 \leq x \leq 0.25$, $-0.2 \leq y \leq 0.2$, and $-0.2 \leq z \leq 0.2$.

3. The method of producing a thiogallate-based fluorescent material according to claim 1, wherein firing the mixed powder is performed under a hydrogen sulfide atmosphere.

4. The method of producing a thiogallate-based fluorescent material according to claim 1, wherein an equivalent ratio of sulfite ions to a total of M1 and M2 is in a range of 1.01 to 1.30.

5. The method of producing a thiogallate-based fluorescent material according to claim 1, wherein a pH of the second solution is adjusted in a range of 7.0 to 8.0.

6. The method of producing a thiogallate-based fluorescent material according to claim 1, further comprising preparing a third solution containing a sulfite with sulfite ions in an equivalent ratio of 0.2 or less with respect to a total of M1 and M2 in a reaction vessel prior to the step of obtaining the powder.

7. The method of producing a thiogallate-based fluorescent material according to claim 6, wherein a pH of the third solution is adjusted in a range of 7.0 to 8.0.

8. The method of producing a thiogallate-based fluorescent material according to claim 1, wherein in obtaining the powder a temperature of the reaction system is in a range of 15° C. to 30° C.

9. The method of producing a thiogallate-based fluorescent material according to claim 2, wherein M1 contains at least strontium and optionally contains at least one element selected from the group consisting of calcium, and barium, and M2 is europium.

10. A method of producing a thiogallate-based fluorescent material, comprising:
    preparing a first solution containing an element M1 that is strontium and an element M2 that is europium;
    preparing a second solution containing a sulfite;
    simultaneously supplying the first solution and the second solution to a reaction vessel and causing a reaction in a reaction system to obtain a powder of $(Sr,Eu)SO_3$;
    separating the powder of $(Sr,Eu)SO_3$ from the reaction system to obtain a powder of isolated $(Sr,Eu)SO_3$;
    mixing the powder of isolated $(Sr,Eu)SO_3$ and a powder of a gallium compound to obtain a mixed powder; and
    firing the mixed powder to obtain the thiogallate-based fluorescent material,
    wherein in obtaining the powder of $(Sr,Eu)SO_3$, a pH of the reaction system is adjusted in a range of 5.0 to 6.0.

11. The method of producing a thiogallate-based fluorescent material according to claim 10, wherein the thiogallate-based fluorescent material is represented by a formula:

$$(M1_{1-x}M2_x)Ga_{2-y}S_{4-z}$$

wherein M1 is strontium,
wherein M2 is europium, and
wherein x, y and z satisfy $0.03 \leq x \leq 0.25$, $-0.2 \leq y \leq 0.2$, and $-0.2 \leq z \leq 0.2$.

12. The method of producing a thiogallate-based fluorescent material according to claim 10, wherein firing the mixed powder is performed under a hydrogen sulfide atmosphere.

13. The method of producing a thiogallate-based fluorescent material according to claim 10, wherein an equivalent ratio of sulfite ions to a total of M1 and M2 is in a range of 1.01 to 1.30.

14. The method of producing a thiogallate-based fluorescent material according to claim 10, wherein a pH of the second solution is adjusted in a range of 7.0 to 8.0.

15. The method of producing a thiogallate-based fluorescent material according to claim 10, further comprising preparing a third solution containing a sulfite with sulfite ions in an equivalent ratio of 0.2 or less with respect to a total of M1 and M2 in a reaction vessel prior to the step of obtaining the powder.

16. The method of producing a thiogallate-based fluorescent material according to claim 15, wherein a pH of the third solution is adjusted in a range of 7.0 to 8.0.

17. The method of producing a thiogallate-based fluorescent material according to claim 10, wherein in obtaining the powder a temperature of the reaction system is in a range of 15° C. to 30° C.

18. A method of producing a thiogallate-based fluorescent material, comprising:
preparing a first solution containing at least one element M1 selected from the group consisting of strontium, beryllium, magnesium, calcium, barium and zinc, a second solution containing at least one element M2 selected from the group consisting of europium and cerium, and a third solution containing a sulfite;
simultaneously supplying the first solution, the second solution, and the third solution to a reaction vessel and causing a reaction in a reaction system to obtain a powder of a sulfite containing M1 and M2 and not containing gallium; and
obtaining the thiogallate-based fluorescent material from the resulting powder of a sulfite containing M1 and M2 and not containing gallium,
wherein M1 contains at least strontium and optionally contains at least one element selected from the group consisting of beryllium, magnesium, calcium, barium, and zinc,
wherein M2 contains at least europium and optionally contains cerium,
wherein in obtaining the powder a pH of the reaction system is adjusted in a range of 5.0 to 6.0, and
wherein obtaining the thiogallate-based fluorescent material comprises mixing the powder of the sulfite containing M1 and M2 and not containing gallium and a powder of a gallium compound to obtain a mixed powder and firing the mixed powder.

19. The method of producing a thiogallate-based fluorescent material according to claim 18, wherein the thiogallate-based fluorescent material is represented by a formula:

$(M1_{1-x}M2_x)Ga_{2-y}S_{4-z}$ wherein M1 contains at least strontium and optionally contains at least one element selected from the group consisting of beryllium, magnesium, calcium, barium, and zinc, and
wherein M2 contains at least europium and optionally contains cerium, and
wherein x, y and z satisfy $0.03 \leq x \leq 0.25$, $-0.2 \leq y \leq 0.2$, and $-0.2 \leq z \leq 0.2$.

20. The method of producing a thiogallate-based fluorescent material according to claim 18, wherein firing the mixed powder is performed under a hydrogen sulfide atmosphere.

21. The method of producing a thiogallate-based fluorescent material according to claim 18, wherein an equivalent ratio of sulfite ions to a total of M1 and M2 is in a range of 1.01 to 1.30.

22. The method of producing a thiogallate-based fluorescent material according to claim 18, wherein a pH of the third solution is adjusted in a range of 7.0 to 8.0.

23. The method of producing a thiogallate-based fluorescent material according to claim 18, further comprising preparing a fourth solution containing a sulfite with an equivalent ratio of sulfite ions to the total of M1 and M2 of 0.2 or less in a reaction vessel prior to the step of obtaining the powder.

24. The method of producing a thiogallate-based fluorescent material according to claim 23, wherein a pH of the fourth solution is adjusted in a range of 7.0 to 8.0.

25. The method of producing a thiogallate-based fluorescent material according to claim 18, wherein in obtaining the powder the temperature of the reaction system is in a range of 15 to 30° C.

26. The method of producing a thiogallate-based fluorescent material according to claim 19, wherein in the formula, M1 contains at least strontium and optionally contains at least one element selected from the group consisting of calcium, and barium, and M2 is europium.

27. A method of producing a thiogallate-based fluorescent material, comprising:
preparing a first solution containing an element M1 that is strontium, a second solution containing an element M2 that is europium, and a third solution containing a sulfite;
simultaneously supplying the first solution, the second solution, and the third solution to a reaction vessel and causing a reaction in a reaction system to obtain a powder of $(Sr,Eu)SO_3$; and
separating the powder of $(Sr,Eu)SO_3$ from the reaction system to obtain a powder of isolated $(Sr,Eu)SO_3$;
mixing the powder of isolated $(Sr,Eu)SO_3$ and a powder of a gallium compound to obtain a mixed powder; and
firing the mixed powder to obtain the thiogallate-based fluorescent material,
wherein in obtaining the powder of $(Sr,Eu)SO_3$, a pH of the reaction system is adjusted in a range of 5.0 to 6.0.

* * * * *